United States Patent [19]

Bau et al.

[11] 3,757,106
[45] Sept. 4, 1973

[54] LIGHT-EFFECT GENERATOR

[75] Inventors: Peter Bau, Vienna, Austria; Achim Reichelt; Gerhard Winzer, both of Munich, Germany

[73] Assignee: Siemens Aktiengesellschaft, Munich, Germany

[22] Filed: Mar. 26, 1971

[21] Appl. No.: 128,276

[30] Foreign Application Priority Data
Apr. 9, 1970 Germany............... P 20 17 084.7

[52] U.S. Cl. .............................. 240/10 R, 240/10.1
[51] Int. Cl. ........................ A47g 33/16, F21p 1/02
[58] Field of Search .................. 240/10 R, 10.1; 350/160 R, 160 P

[56] References Cited
UNITED STATES PATENTS

| 3,650,608 | 3/1972 | Baker | 352/40 X |
|---|---|---|---|
| 3,647,959 | 3/1972 | Schlesinger | 350/160 P |
| 3,622,224 | 11/1971 | Wysocki | 350/160 LC |
| 3,538,323 | 11/1970 | Ziegler | 240/10.1 |
| 3,569,616 | 3/1971 | Baker | 350/160 X |
| 3,586,416 | 6/1971 | De Biteito | 350/160 |
| 3,533,399 | 8/1965 | Goldberg | 350/160 R |
| 3,056,019 | 9/1962 | Apatoff | 240/10.1 |
| 3,588,324 | 6/1971 | Marie | 350/160 R X |
| 3,418,050 | 12/1968 | Jeffee | 355/90 |
| 3,366,786 | 1/1968 | Delano | 240/10 R |
| 2,959,094 | 11/1960 | Kosma | 240/10 R X |

Primary Examiner—Samuel S. Matthews
Assistant Examiner—Monroe H. Hayes
Attorney—Hill, Sherman, Meroni, Gross & Simpson

[57] ABSTRACT

Lighting effects for theaters, advertising, etc., are obtained by a lighting apparatus having at least one coherent light source, preferably a gas laser beam, projecting a beam of light onto and/or through an effect member so that various lighting sensations and/or patterns are simply and easily produced. The lighting effect member may advantageously comprise a translucent disk which is rotated by a motor. The disk may include thermally responsive material, a liquid material, glass configurations, a lacquer layer having a thickness equal to many light-wave lengths etc. One or more light beams may be employed and the effect member may include a plurality of disks arranged one behind the other.

3 Claims, 2 Drawing Figures

INVENTORS
Peter Baum
Achim Reichelt
Gerhard Winzer

LIGHT-EFFECT GENERATOR

BACKGROUND OF THE INVENTION

This invention generally relates to an apparatus for producing various lighting effects and light patterns by means of one or more coherent light sources and light effect creating means.

The use of lighting to create various effects in the theater, in advertising etc., is known. Prior to the invention herein, however, these lighting effects have been carried out by means of incoherent light. Thus, the incoherent light is projected onto or through various means to create their effect. When applied to these various effect means the incoherent light produced a lighting effect of limited range because of the lack of orderly continuity of the light.

SUMMARY OF THE INVENTION

The limitations of the prior art are overcome by a light-effect apparatus according to the invention which comprises one or more light sources and a light effect means. By this means the range of possible variations in lighting is greatly expanded.

Lasers and particularly gas lasers serve as the coherent light source to produce beams of light which are projected to a light effect producing means. Where the effect means is translucent the beam or beams are projected through the effect producing means and onto a screen generally in the path of the laser light beam, the configuration of the light effect means will distort the laser beam and produce surprising lighting effects. The lighting effect means may take many different forms depending upon the effect to be created. Thus, it may comprise a diffusion disk of glass having varying granulation and structure with a surface that includes crystals or splinters in pearls or rounded objects.

It is contemplated by the invention herein that light patterns and movements may be created where the light effect means is a dynamic diffusion member, as for example, an electrically controllable liquid crystalline means, thermically movable emulsified liquids, or thermically responsive liquid surfaces which create visible lines or streaks of demarcation. Yet another example of the light effect means is a glass disk having an undulating surface and mounted for rotation.

A particularly effective light effect means can be produced, according to this invention, by applying a lacquer layer, as for example, a photo-lacquer layer, to a transluscent carrier such as a glass plate, for example, so that the lacquer layer is several light wave lengths thick, in the order of $15\mu$. m. The photo-lacquer layer is applied to the carrier and then dried so fast that a generally statistically distributed thickness variation occurs over the flat surface of the carrier whereby the lacquer layer serves as a refracting medium with the coherent light being broken-up into different optical paths. By selecting and varying the concentration of the solution and the drying speed the thickness of the layer as well as the variations in the layer thickness caused by drying may be widely varied. The refraction and interference patterns which can be produced according to this method differ in kind from those which are produced by other lighting effect means. This disk in turn can be moved such as by rotating, for example.

In the further embodiment of the invention it is contemplated that several of the light effect producing means may be arranged one behind another so that the light from the light source will pass through each of the effect means and thereby multiply the phenomena which can be produced. Again, the individual effect means may be collectively or individually moved to further increase the range of phenomena. The effect means may be in parallel planes or disposed at angles to each other.

In one arrangement of the invention the beam of light from the light source is projected through the effect means and onto a screen to produce the lighting effect. One or a plurality of light beams may be used. The light beam may be either focused through a focal point or be in the form of a narrow laser beam. In addition, we have found that a beam expanded by suitable means such as an expanding object inserted in the beam path provides a protection to onlookers from possible radiation damage to the retina by the laser beam. This is particularly true in behind the screen projection where the laser beam is projected toward the audience through a screen. By means of the expansion device the laser beam is diffused sufficiently so that no eye damage could occur. It will be understood that the light may be projected from in front of the screen, behind the screen, below the screen or various other positions to produce the desired effect.

The apparatus of the invention is advantageously designed to be mobile and provide great flexibility in positioning and use. Thus, the light effect producing means is slidable on the optical axis of the light source as well as shiftable and tiltable to and from the optical axis. The effect producing means may be movable either manually or by suitable mechanical and motor means. The movement of the light effect means enables the apparatus to produce many very different patterns such as, for example, a hectically racing confusion of granulation grains, dancing patterns, flame and fire impressions, waterfalls, etc. The patterns may be very finely structured, coarsely structured or even variable between the two. Thus, by varying the type, structure, number, movement, and position of the light effect producing means, a very extreme range in light effect patterns may be produced.

By means of the light effect producing apparatus according to the invention which comprises one or more coherent light sources and a variable light effect producing means, lighting effects for the theater, advertising, photography, etc., may be easily and simply produced in a range of patterns and configurations heretofore unknown.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
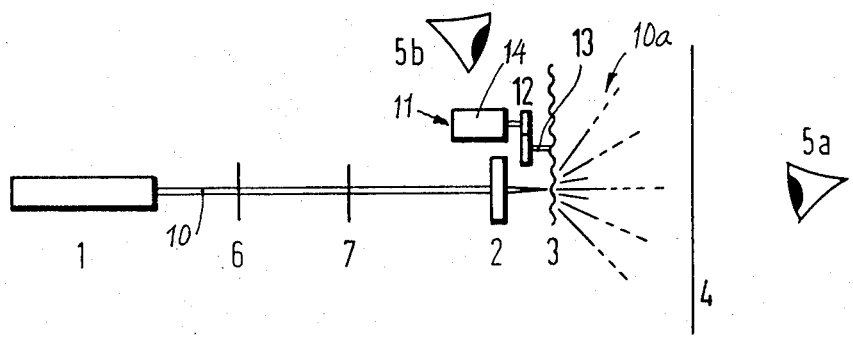
FIG. 1 illustrates a light effect producing apparatus according to the invention wherein a single light source is projected through a movable light effect producing means onto a screen which screen may be viewed from either side.

Referring to FIG. 1 there may be seen a coherent light source 1 producing a beam of light 10 which is projected to a light effect producing means generally indicated at 11 which diffuses the light beam as schematically illustrated by the lines 10a whereby a very wide range of the patterns and effects will be produced on a screen 4.

The coherent light source 1 may comprise a helium-neon laser which produces the laser beam of light 10. The brightness and configuration of the light beam which is projected to the light effect producing means 11 may be varied by suitable means. In the illustrated embodiment of FIG. 1 there have been provided suitable light control means 6 and 7 spaced along the light beam between the light source 1 and the light effect producing means 11 which serve to control the intensity and distribution of the light 10. Thus, we have provided an expansion or focusing means 2 in the path of the light 10 to effectively expand the parallel laser light beam 10. The intensity and distribution of the light 10 may be varied by an attenuator or damping device 6 which serves to adjust the light beam intensity. A further light adjustment means 7 arranged in the beam path may comprise a small eccentric disk with a boring means arranged therein through which the beam of light 10 is varied in its local intensity distribution. The light control means 2, 6 and 7 may be selectively used individually or in combination and in various positions relative to each other.

The light effect producing means 11 as shown in FIG. 1 comprises an effect member 3 which is rotated about its axis 13 by a gear means 12 connected to a motor means 14. As shown the effect member 3 is located near the focusing point or at the focusing point of the optical member 2 of the light control means. In this arrangement the beam of light 10 passes through the light control means and is diffused by the effect member 3 to take the paths schematically illustrated at 10a. The light 10a which passes through the effect member 3 and is diffused or scattered thereby in a three dimensional pattern reaches the screen 4 where it may be observed by onlookers whose position is schematically illustrated by the eye-like means 5a and 5b to be on the same or opposite sides of the lighting effect apparatus. With a translucent screen the display may be observed from both sides as will be understood by those skilled in the art. With the observer in the position as indicated at 5a it is important to avoid injury to the retina by the direct laser beam. We have discovered that expanding the laser beam 10 by suitable means such as an expanding optical control means 2 inserted in the laser beam path provides a protection to onlookers from possible radiation damage by diffusing the laser beam sufficiently so that no eye damage can occur. The two positions of observation as well as the screen position with respect to the laser beam 10 are by way of example only, and it will be understood that the screen 4 may be observed from any angle and that the angle between the laser beam 10 and the screen may be hemispherically varied.

The light effect member 3 may have a wide range of designs, configurations and characteristics depending upon the effect to be created. Thus, the effect member 3 may comprise a plate of glass having suitable variable granulation and structure such as would be provided, for example, by a surface that includes glass crystals or splinters or rounded objects thereon. Another suitable type of object member 3 includes dynamic diffusion members as, for example, electrically controllable liquid crystalline means which change or vary with changes in temperature, movement, and/or electrical means. Other examples of dynamic diffusion members include thermically movable or excitable emulsified liquids and thermically responsive liquid surfaces which create visible lines or streaks of demarcation when subjected to changes in temperature. These variations in the characteristics of the effect member 3 are represented by the undulating pattern of the disk. In addition a disk having such an undulating surface may be used and mounted for rotation.

We have discovered that a particularly effective light effect means may be produced by applying a layer of a lacquer substance such as, for example, a photo-lacquer, to a translucent carrier such as a glass plate. When the photo-lacquer layer is applied to the carrier in the thickness of several light wave lengths and then dried fast, a generally statistically distributed thickness variation occurs over the flat surface of the carrier whereby the lacquer layer serves as a refracting medium with the coherent light being broken up into many different optical paths. By selecting and varying the concentration of the solution and the drying speed, the thickness of the layer as well as the variations in the layer thickness caused by drying may be widely varied to produce many different patterns. The variety of patterns which may be produced with an effect member of this construction vary greatly from anything which is known in the prior art.

Figure 2:
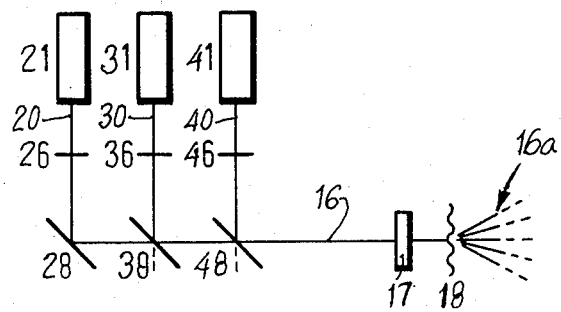
FIG. 2 illustrates an arrangement for the production of abstract lighting effects according to the invention herein wherein a plurality of coherent light sources are employed.

A further arrangement of the invention herein is illustrated in FIG. 2 where it may be seen that a plurality of beams of light 20, 30 and 40 eminating from light sources 21, 31 and 41 are each projected through light control means 26, 36, 46, change direction by means of mirrors 28, 38 and 48 and pass through an optical light control means 17 after which they intersect the effect member 18 and are dispersed as schematically illustrated by the path 16a. It may be seen that the arrangement of FIG. 2 corresponds generally to that of FIG. 1, however, in order to obtain multiple colors we have discovered that this multiple laser arrangement is very advantageous. Thus, the light sources 21, 31 and 41 may be gas lasers emitting multi-colored beams of light 20, 30 and 40 which pass through an intensity adjusting atenuator 26, 36 and 46 respectively. The mirror 28 is fully reflective while the mirrors 38 and 48 are partially permeable dichroic mirrors which reflect light of one color and transmit light of other colors. In this way the light striking the effect producing means 18 may be of various multi-colors. The light effect producing means 18 may of course be of the same types as set forth with respect to FIG. 1 so that a very great range of light patterns and effects may be produced.

From the foregoing description of the invention it may be seen that variable lighting effects useful in theater, advertising, photography etc., may be easily and simply produced by the invention herein in a range of patterns and configurations heretofore unknown. Although minor modifications might be suggested by those versed in the art, it should be understood that we wish to embody within the scope of the patent warranted hereon all such modifications as reasonably and properly come within the scope of our contribution to the art.

We claim:

1. A lighting apparatus for producing lighting effects and patterns comprising at least two coherent light sources for providing coherent light beams of different colors, light effect producing means for imparting a change in a coherent light beam projected thereon, and means for directing the coherent light beams onto the light effect producing means, said means for directing including a first mirror for reflecting the coherent light beam from one source into a path directed at the light effect producing means, and a permeable dichroic mirror associated with each of the remaining sources of coherent light, said dichroic mirrors being arranged in said path for reflecting the colored beam of its associated coherent light source into said path while passing the remaining colors.

2. A lighting apparatus for producing lighting effects and patterns comprising at least one coherent light source providing a coherent light beam, light effect producing means for imparting a change in a coherent light beam projected thereon, said lighting effect producing means comprising a translucent carrier member having a lacquer layer disposed thereon, said layer having variations in its thickness to provide a texture surface, and means for directing the coherent light beam onto the light effect producing means so that various light effects and patterns are generated by the apparatus.

3. A lighting apparatus according to claim 2, wherein said lacquer layer has portions of a thickness of many wave lengths of the coherent light beam.

* * * * *